US012045020B2

(12) United States Patent
Cassagne et al.

(10) Patent No.: US 12,045,020 B2
(45) Date of Patent: Jul. 23, 2024

(54) COMPUTER-IMPLEMENTED METHOD OF PROVIDING TECHNICAL SIZING PARAMETERS OF AN ENERGY SUPPLY SYSTEM, COMPUTER PROGRAM PRODUCT FOR PROVIDING SUCH TECHNICAL SIZING PARAMETERS, AND COMPUTER SYSTEM FOR PROVIDING SUCH AN ENERGY SUPPLY SYSTEM

(71) Applicant: TOTAL SOLAR, Courbevoie (FR)

(72) Inventors: Valérick Cassagne, Limours (FR);
Ana-Rita De Medeiros, Paris (FR);
Hervé Kleiss, Reichstett (FR)

(73) Assignee: TOTAL SOLAR, Courbevoie (FR)

( * ) Notice: Subject to any disclaimer, the term of this patent is extended or adjusted under 35 U.S.C. 154(b) by 466 days.

(21) Appl. No.: 17/295,811

(22) PCT Filed: Nov. 15, 2019

(86) PCT No.: PCT/EP2019/081555
§ 371 (c)(1),
(2) Date: May 20, 2021

(87) PCT Pub. No.: WO2020/104338
PCT Pub. Date: May 28, 2020

(65) Prior Publication Data
US 2022/0026860 A1    Jan. 27, 2022

(30) Foreign Application Priority Data
Nov. 23, 2018    (EP) .................................... 18306557

(51) Int. Cl.
*H02J 13/00*    (2006.01)
*G05B 11/01*    (2006.01)
(Continued)

(52) U.S. Cl.
CPC ........... *G05B 11/017* (2013.01); *G06Q 50/06* (2013.01); *H02J 3/32* (2013.01); *H02J 3/381* (2013.01);
(Continued)

(58) Field of Classification Search
CPC ................................................ H02J 13/00001
See application file for complete search history.

(56) References Cited

U.S. PATENT DOCUMENTS

| | | | | |
|---|---|---|---|---|
| 2013/0342018 A1* | 12/2013 | Moon | ....................... | H02J 3/40 |
| | | | | 307/80 |
| 2014/0080406 A1* | 3/2014 | Freitas | .................... | H02J 9/061 |
| | | | | 315/86 |
| 2017/0271878 A1* | 9/2017 | Feng | ....................... | H02J 3/381 |

FOREIGN PATENT DOCUMENTS

| | | | | |
|---|---|---|---|---|
| CN | 108183500 | | 6/2018 | |
| CN | 110112711 A | * | 8/2019 | ............ H02H 7/262 |
| DE | 102015102430 A1 | * | 8/2016 | |
| JP | 2013-27210 | | 2/2013 | |

(Continued)

OTHER PUBLICATIONS

European Examination Report regarding corresponding European case (App. No. EP18306557), dated Oct. 20, 2022.
(Continued)

*Primary Examiner* — Suresh Suryawanshi
(74) *Attorney, Agent, or Firm* — McDonnell Boehnen Hulbert & Berghoff LLP (57) ABSTRACT

The present invention relates to a computer-implemented method of providing technical sizing parameters for an energy supply system supplying electrical energy to an installation connected to a public grid subject to potential service interruptions, said computer-implemented method comprising the steps of: •entering electricity consumption chronology (S1) of said installation; •entering photovoltaic
(Continued)

production capacity limits and energy storage unit capacity limits (S9); •estimating a ratio (S11) of self-sufficiency or of self-consumption, or of internal rate of return; •displaying (S13) a plurality of energy supply system configurations on user interface means; wherein each configuration is associated to a sensitivity parameter, said sensitivity parameter enabling to determine the optimized technical sizing parameters of the energy supply system regarding the reliability of the public grid. The present invention further relates to a computer program product aimed at being executed on a computer system to implement this computer-implemented method.

21 Claims, 6 Drawing Sheets

(51) Int. Cl.
  *G06Q 50/06* (2012.01)
  *H02J 3/32* (2006.01)
  *H02J 3/38* (2006.01)
(52) U.S. Cl.
  CPC ..... *H02J 13/00001* (2020.01); *H02J 2203/20* (2020.01); *H02J 2300/24* (2020.01); *Y02E 40/70* (2013.01)

(56) References Cited

FOREIGN PATENT DOCUMENTS

| | | | |
|---|---|---|---|
| JP | 2014-124059 | 7/2014 | |
| JP | 2016-005347 | 1/2016 | |
| WO | WO-2019225834 A1 * | 11/2019 | ............... H02J 7/35 |

OTHER PUBLICATIONS

Ying-Yi Hong et al: "Optimal Sizing of Hybrid Wind/PV/Diesel Generation in a Stand-Alone Power System Using Markov-Based Genetic Algorithm", IEEE Transactions on Power Delivery, IEEE Service Center, New York, NY, US, vol. 27, No. 2, Apr. 1, 2012 (Apr. 1, 2012), pp. 640-647 ISSN: 0885-8977, DOI: 10.1109/TPWRD.2011.2177102.
Tom Lambert et al.: "Micropower System Modeling with Homer" In: "Integration of Alternative Sources of Energy", Dec. 16, 2005 John Wiley & Sons, Inc., Hoboken, NJ, USA, pp. 379-418 XP055971702, ISBN: 978-0-471-71232-9, DOI: 10.1002/0471755621.ch15 1.2.
Marilyn Walker: Modeling Grid Reliability with the HOMER Optimization Modeling Toof HOMER Microgrid News, https://microgridnews.com/modeling-grid-reliability-with-the-homer-optimization-modeling-tool/ XP055971784, Apr. 28, 2015.
Examination Report regarding corresponding Indian case (App. No. 202147018729), dated Jan. 5, 2023.
Office Action for Japanese counterpart, Application No. 2021-519590, issued Sep. 13, 2023 with English translation.

* cited by examiner

| 30 | | 11 (kWc) | | | | | |
|---|---|---|---|---|---|---|---|
| | | 10 | 22.9 | 35.7 | 48.6 | 61.4 | 74.3 | 100 |
| 13 (kWh) | 10 | -100.0% | -10.7% | -15.4% | -21.9% | -27.7% | -31.9% | -37.2% |
| | 25 | -100.0% | -4.1% | -6.7% | -14.4% | -27.7% | -100.0% | 0.0% |
| | 40 | -100.0% | 10.5% | 6.7% | 4.4% | -40.7% | -0.9% | 0.0% |
| | 55 | -100.0% | 11.1% | 9.3% | 6.2% | 0.6% | 0.2% | 0.1% |
| | 70 | -100.0% | 11.6% | 8.9% | 7.4% | 1.3% | 3.6% | 1.1% |
| | 100 | -100.0% | 10.8% | 12.1% | 9.6% | 4.0% | 6.1% | 3.1% |

| 20 | | 11 (kWc) | | | | | |
|---|---|---|---|---|---|---|---|
| | | 10 | 22.9 | 35.7 | 48.6 | 61.4 | 74.3 | 100 |
| 13 (kWh) | 10 | 23.80% | 23.20% | 16.80% | 13.00% | 10.50% | 8.90% | 6.70% |
| | 25 | 23.90% | 33.30% | 24.20% | 18.40% | 14.70% | 12.30% | 9.10% |
| | 40 | 23.90% | 79.80% | 63.40% | 49.80% | 41.00% | 35.00% | 26.70% |
| | 55 | 23.90% | 84.50% | 68.20% | 53.90% | 44.30% | 37.70% | 28.80% |
| | 70 | 23.90% | 87.60% | 72.60% | 57.80% | 47.60% | 40.50% | 30.90% |
| | 100 | 23.90% | 88.80% | 77.80% | 62.20% | 52.80% | 45.10% | 34.40% |

| 10 | | 11 (kWc) | | | | | |
|---|---|---|---|---|---|---|---|
| | | 10 | 22.9 | 35.7 | 48.6 | 61.4 | 74.3 | 100 |
| 13 (kWh) | 10 | 81.60% | 87.30% | 88.90% | 89.60% | 90.10% | 90.50% | 90.90% |
| | 25 | 81.60% | 88.40% | 90.20% | 91.00% | 91.50% | 91.80% | 92.30% |
| | 40 | 81.70% | 89.40% | 91.40% | 92.30% | 92.90% | 93.20% | 93.60% |
| | 55 | 81.70% | 90.20% | 92.60% | 93.60% | 94.30% | 94.60% | 95.10% |
| | 70 | 81.70% | 90.80% | 93.70% | 95.70% | 95.70% | 96.10% | 96.60% |
| | 100 | 81.70% | 91.10% | 96.30% | 98.90% | 98.90% | 99.30% | 99.50% |

Fig. 6

COMPUTER-IMPLEMENTED METHOD OF PROVIDING TECHNICAL SIZING PARAMETERS OF AN ENERGY SUPPLY SYSTEM, COMPUTER PROGRAM PRODUCT FOR PROVIDING SUCH TECHNICAL SIZING PARAMETERS, AND COMPUTER SYSTEM FOR PROVIDING SUCH AN ENERGY SUPPLY SYSTEM

CROSS REFERENCE TO RELATED APPLICATION

This application is a U.S. National Phase of International Application No. PCT/EP2019/081555, filed Nov. 15, 2019, which claims priority to European Patent Application No. 18306557.2, filed Nov. 23, 2018, both of which are incorporated by reference herein in their entirety.

The present invention relates to the field of sizing of energy supply systems comprising renewable energy source, such as photovoltaic sources for example, for designing the energy supply system aimed at being installed on an installation such as a private home, a building, an industrial site, or a service station for example.

Due to the decrease of the fossil energy resources and the increase of the pollution produced by the consumption of such fossil energies, renewable energy sources are more and more popular and energy consumption is more and more directed in an environmental friendly logic. Such tendency tends to focus on solar energy and more particularly photovoltaic energy.

Moreover, in order to decrease the nuclear part of the electricity consumption, more and more buildings are equipped with renewable electricity generating units, such as for example photovoltaic electricity generation units. Many of these installations are semi-autonomous installations, that is to say that those semi-autonomous installation are connected to a public grid aimed at providing electricity to this semi-autonomous installation in the case where the renewable electricity generating units would not be able to produce enough electric energy to meet the energy needs of this semi-autonomous installation.

It is thus necessary to design an optimized energy supply system such that the latter would be the more efficient and the less expensive. To design this optimized energy supply system, it is necessary to determine some information such as for example the electricity consumption chronology for a predetermined time period of the installation, or the specific location of such installation. Such information would enable to determine different technical sizing parameters of different configurations in order to obtain an efficient energy supply system regarding the needs of the installation and the photovoltaic module yearly production curves.

Furthermore, in some countries, the public grid can be subject to service interruptions. In such a case, the design of the energy supply unit has to be adapted to take into consideration such service interruptions.

Some prior art documents disclose computer implemented methods that enable to determine some technical sizing parameters for an energy supply system.

For example, the article "Design and economic analysis of a photovoltaic system: a case study", Oko & al., International Journal of Renewable Energy Development 1 (3), 2012, pp. 65-73 implements a Microsoft Excel® based software to determine the optimal sizes of a photovoltaic array and of a battery storage to meet the electrical demand of a stand alone installation. To compute the different technical sizing parameters, the user should input into a computer program parameters such as: the power rating of the facility, the continuous cloudy days, the physical size dimensions of the installation. Such computer program takes into account the reliability of the energy supply system based on past conditions. However, due to the climate changes, such determination could be insufficient to ensure the need of the electrical demand of this installation. That's why the energy supply system disclosed in this document further comprises a diesel generator aimed at generating electricity. However such computer implemented method are not suitable to determine technical sizing parameter of installations aimed at being in region with a non-reliable public grid.

In order to traverse the drawback of the use of chronological data, it is known from the article "Optimal sizing of hybrid wind/photovoltaic/diesel generation in a stand-alone power system using Markov-based genetic algorithm", Hong & al., IEEE Transactions on Power Delivery, vol. 27, issue 2, April 2012, pp. 640-647, the use of a Markov model to predict the further radiation and thus the system load evolution. However, this document still refers to stand alone installation and does not take into account the reliability of the public grid onto which the installation is connected.

The different prior art documents do not take into consideration the reliability of the energy supply system and of the public grid to compute the technical sizing parameters of the installation. Defaults of reliability can be caused by weather conditions for example for renewable energy sources and service interruptions for example of the public grid. Thus, it is a need to develop a method for sizing the energy supply system taking into account at least the reliability of the renewable energy source and of the public grid.

The goal of the present invention is to solve at least partially the drawback of the prior art discussed here-above by proposing a computer-implemented method enabling to determine technical sizing parameters for an energy supply system comprising a photovoltaic electricity generation unit aimed at being installed on an existing support structure of an installation having at least one consumer unit and being connected to a public grid.

To reach at least partially this goal, the present invention concerns a computer-implemented method of providing technical sizing parameters for an energy supply system on an existing support structure having a predetermined available surface to be equipped with photovoltaic modules, said energy supply system comprising at least
   a photovoltaic electricity generation unit having at least one photovoltaic module,
   an energy storage unit, and
   at least one thermal engine driven electricity generation unit, the energy supply system being configured to supply electrical energy to an installation having at least one consumer unit and being connected to a public grid subject to potential service interruptions. The computer-implemented method comprises the steps of:
   entering for a predetermined time period electricity consumption chronology of said installation in a database via user interface means;
   entering photovoltaic module yearly production curve for a specific location;
   entering a type of photovoltaic module and at least some of its technical parameters;
   entering specific equipment boundary conditions to illustrate the existing conditions of the installation;
   entering photovoltaic production capacity limits and energy storage unit capacity limits;

estimating a ratio of self-sufficiency or of self-consumption, or of internal rate of return based on several values of the photovoltaic production capacity and of the energy storage unit capacity, said values being comprised between the limits defined at the step of entering photovoltaic production capacity limits and energy storage unit capacity limits;

displaying a plurality of energy supply system configurations on the user interface means, said plurality of energy supply system configurations being based on:
    said technical sizing parameters obtained at the previous steps;
    a cost of each energy supply system configuration; and
    an aging devaluation of each energy supply system configuration;

wherein each configuration is associated to a sensitivity parameter based on an energy production reliability of said energy supply system and on a grid reliability of said public grid, said sensitivity parameter enabling determining the optimized technical sizing parameters of the energy supply system regarding the reliability of the public grid.

This computer-implemented method enables designing an energy supply system to obtain an optimal produced energy for ensuring the electrical energy needs of such installation, this method determining several configurations for the energy supply system according to a sensitivity parameter taking at least into consideration the energy production reliability of this energy supply system and the grid reliability in order to prevent any energy failure in this installation.

The computer-implemented method according to the present invention may have one or more of the following characteristics taken alone or in combination.

The method may further comprise a step of entering technical parameters of the at least one thermal engine driven electricity generation unit, said step being performed just after the step of entering specific equipment boundary conditions.

According to a particular embodiment, this step may be performed for each thermal engine driven electricity generation unit.

The sensitivity parameter may further take into account an evolution cost of the propellant for the thermal energy driven electricity generation unit.

The method may compute the energy produced by the at least one thermal energy driven electricity generation unit.

The at least one thermal engine driven electricity generation unit may be chosen among fuel generator or diesel generator.

According to another particular embodiment, the method may further comprise a step of entering technical parameters of the energy storage unit, said step being performed before the step of entering production capacity limits and energy storage capacity limits.

The energy storage unit may comprise one or more modules.

The energy storage unit may be chosen among a lead battery open or closed, a nickel battery such as a nickel metal hydride battery, or a lithium-ion battery, a lithium-metal battery, or a lithium-polymer battery.

According to this other particular embodiment, the method may compute the cycle number of the energy storage unit to determine the degradation of the energy storage unit.

The database may be in communication with a sizing model able to estimate the technical sizing parameters of the energy supply system based on the entry parameters.

The communication between the database and the sizing model can be an internet communication channel.

According to one aspect, the method may further comprise a step of computing a cost model, said step of computing a cost model being performed just before the step of displaying a plurality of energy supply system configurations to ensure an optimal energy supply system design, said cost model taking into account the energy supply system configuration chosen, the photovoltaic production capacity limits, the energy storage unit capacity limits, and the aging devaluation of the energy supply system configuration.

According to this aspect, the step of computing a cost model may be implemented by a cost module integrated into the database.

According to another aspect, the method may further comprise a step of storing the computed data into the database for a further installation, said step of storing the computed data being performed after the step of displaying a plurality of energy supply system configurations.

The cost model may take into account the size of the energy storage unit.

As a variant or in addition, the cost model may take into account the power of the photovoltaic electricity generation unit.

As another variant or in addition, the cost model may take into account the power of the thermal engine driven electricity generation unit.

According to a particular embodiment, the sensitivity parameter may further be based on a capital expenditure of said energy supply system.

As a variant or in addition, the sensitivity parameter may further take into account the cost of the public grid electricity.

As another variant or in addition, the sensitivity parameter may further take into consideration the maintenance costs and/or the degradation costs.

The method may compute and display on the user interface means power of the photovoltaic electricity generation unit.

As a variant or in addition, the method may further compute and display on the user interface means sizes of modules constituting the energy storage unit.

The present invention further relates to a computer program product for providing technical sizing parameters for an energy supply system on an existing support structure having a predetermined available surface to be equipped with photovoltaic modules. The energy supply system comprises at least:
    a photovoltaic electricity generation unit having at least one photovoltaic module,
    an energy storage unit, and
    at least one thermal engine driven electricity generation unit, the energy supply system being configured to supply electrical energy to an installation having at least one consumer unit and being connected to a public grid subject to potential service interruptions, said computer program product comprising means for computing data obtained at steps of:
    entering for a predetermined time period electricity consumption chronology of said installation in a database via user interface means;
    entering photovoltaic module yearly production curve for a specific location;
    entering a type of photovoltaic module and its technical parameters;
    entering specific equipment boundary conditions to illustrate the existing conditions of the installation;

entering photovoltaic production capacity limits and energy storage unit capacity limits; based on those data, the computer program product computes a ratio of self-sufficiency, or of self-consumption, or of internal rate of return based on several values of the photovoltaic production capacity and the energy storage unit capacity, said values being comprised between the limits entered;

displays a plurality of energy supply system configurations on the user interface means, said plurality of energy supply system configurations being based on:
said technical sizing parameters;
a cost of each energy supply system configurations; and
an aging devaluation of each energy supply system configuration;

wherein the computer program product computes for each configuration a sensitivity parameter based on an energy production reliability of said energy supply system and on a grid reliability of said public grid, said sensitivity parameter enabling to determine the optimized technical sizing parameters of the energy supply system regarding the reliability of the grid.

The computer program product according to the present invention may have one or more of the following characteristics taken alone or in combination.

The computer program product may further comprise a sizing module configured for being in communication with the database, said sizing module being able to estimate the technical sizing parameters of the energy supply system based on the entry parameters.

According to a particular embodiment, the sizing model may be in communication with the database through an internet communication channel.

The computer program product may further comprise a cost module configured for being in communication with the database for computing a cost model taking into account the energy supply system configuration chosen, the photovoltaic production capacity limits, the energy storage unit capacity limits, and the aging devaluation of the energy supply system configuration to ensure an optimal energy supply system design.

As a variant or in addition, the computer program product may further take into account, for computing the sensitivity parameter, a capital expenditure of said energy supply system configuration.

As a variant or in addition, the computer program product may further take into account, for computing the sensitivity parameter, the cost of the electricity of the public grid.

As another variant or in addition, the computer program product may further take into account, for computing the sensitivity parameter, the cost of the propellant for the thermal engine driven electricity generation unit.

The present invention further relates to a computer system for providing technical sizing parameters for an energy supply system on an existing support structure having predetermined available surface to be equipped with photovoltaic modules. The energy supply system comprises at least:
a photovoltaic electricity generation unit having at least one photovoltaic module,
an energy storage unit; and
at least one thermal engine driven electricity generation unit, the energy supply system being configured to supply electrical energy to an installation having at least one consumer unit and being connected to a public grid subject to potential interruptions. The computer system comprises:

user interface means for entering data corresponding to electricity consumption chronology for a predetermined time period of said installation, photovoltaic module yearly production curve for a specific location, said user interface means being further configured for displaying a plurality of energy supply system configurations; and a database able to store the data entered via the user interface means;

the computer system further comprises means for executing the computer program product as previously described for implementing the previously disclosed computer-implemented method to determine optimal technical sizing parameters of said energy supply system.

The user interface means may display the ratio of self-sufficiency, or of self-consumption, or of internal rate of return based on several configurations of the photovoltaic electricity generation unit and of the energy storage unit, said ratio being computed by the computer program product.

Further aspects and advantages of the present invention would appear by reading the following description, given as an illustration and not as a restriction, and with the annexed drawings in which.

On the drawings, the same elements have the same numeral references.

The following embodiments are examples. Even if the specification refers to one or more embodiments, this does not necessary imply that each reference concerns the same embodiment, or that the technical features may only be applied to one and only one embodiment. Simple technical features of different embodiments may be combined or interchanged in order to obtain other embodiments.

In the following specification, reference is made to a first and a second elements for example. It is a simple indexing to differentiate and name differently identical elements. This indexing does not imply any priority of an element with regard to the other, and the man skilled in the art can easily interchange such designations without getting out of the scope of the present invention.

In the following disclosure, the term "cost" has to be interpreted in a broad manner and not just as an economic term. Indeed, the term "cost" has to be interpreted in the following disclosure as the economical cost for the energy supply system but also as the degradation of the energy storage unit, of the photovoltaic modules and of the thermal engine driven electricity generation unit, those degradations corresponding to technical features.

Figure 1:
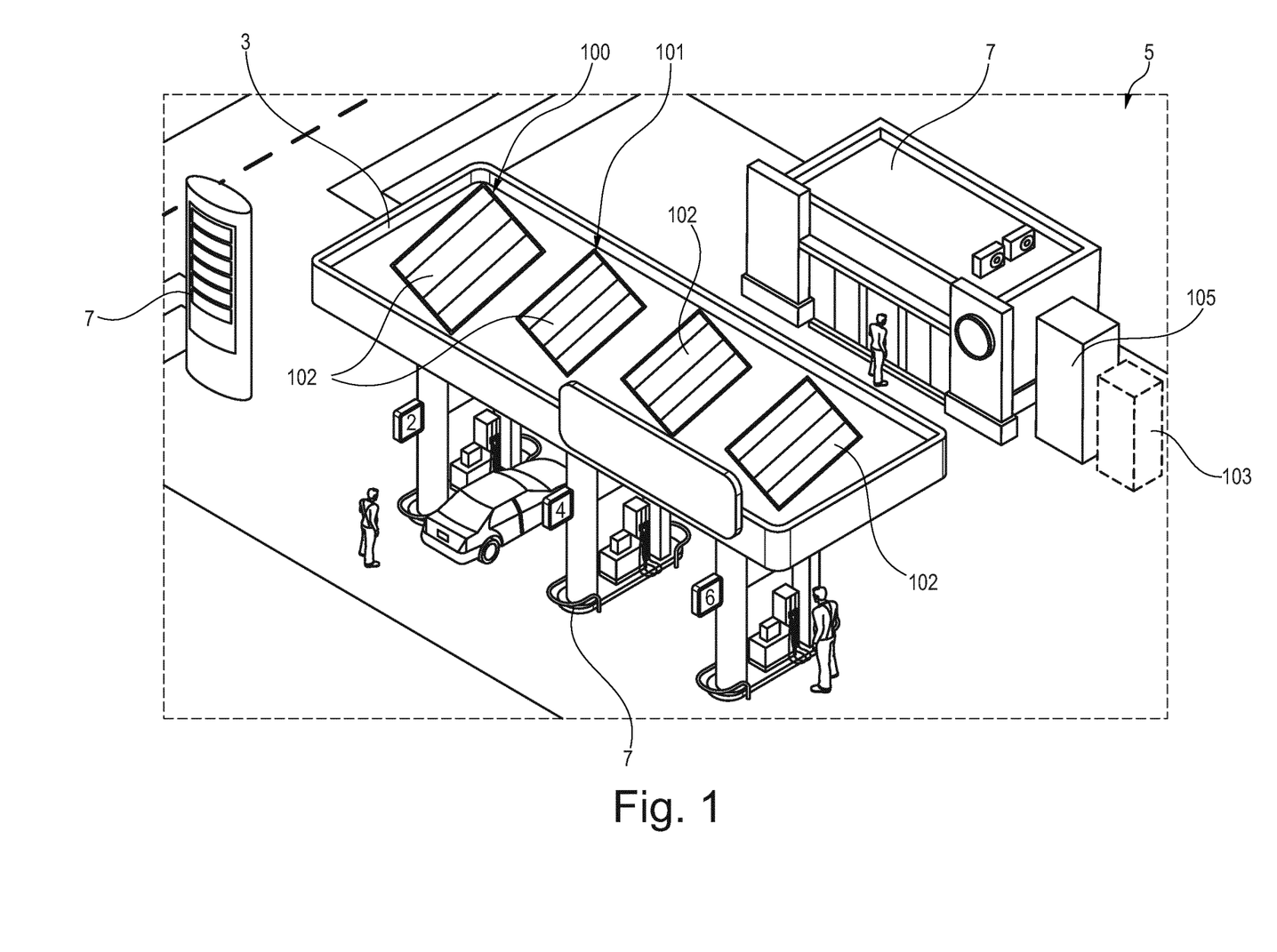
FIG. 1 illustrates a schematic view of a particular installation equipped with an energy supply system.

Installation:

Referring to FIG. 1, there is represented an installation 5 having an existing support structure 3 having predetermined available surface to be equipped with photovoltaic modules 102. This installation 5 has at least one consumer unit 7. The term consumer unit 7 corresponds in the sense of the present disclosure to an element consuming electric energy without limitation, such as lighting elements, air conditioning units, electric engines, fuel pumps . . . . The installation 5 is connected to a public grid (not represented here) subject to potential interruptions.

The photovoltaic modules 102 are part of an energy supply system 100 enabling this installation 5 to reduce at least its electrical consumption from the public grid or to enable this installation 5 to have electricity even if the grid is subjected to interruptions. Indeed, in some countries, the public grid may be subjected to interruptions several times a day or at night. However, such interruptions can be disabling when they occur during the working period for example or for the maintaining of the cold chain for food products. Thus it is necessary to develop energy supply systems 100 enabling this installation 5 to meet its electricity requirements during such grid interruption.

The energy supply system 100 comprises at least a photovoltaic electricity generation unit 101 having at least one photovoltaic modules 102, an energy storage unit 103, and at least one thermal engine driven electricity generation unit 105. Hence, the energy supply system 100 is configured to supply electrical energy to the installation 5.

As well known yet, the photovoltaic modules 102 are aimed at converting solar radiations into electricity due to the photovoltaic effect of the compounds forming those photovoltaic panels 102. According to the particular embodiment of FIG. 1, the installation 5 is a gas station having photovoltaic modules 102 disposed on its roof. However, according to another embodiments not represented here, the installation 5 can be another kind of building, such as shops or factories for example, and the photovoltaic modules 102 may be disposed at other locations of this installation 5 such as for example on the ground or on the carport of this installation 5. According to this particular embodiment, the photovoltaic modules 102 may be silicon-based modules. However, other technologies of photovoltaic modules 102 may be used in the present disclosure, such as organic-based modules, cadmium-tellure-based modules, or selenium and indium copper alloys-based modules.

Moreover, the energy storage unit 103 is aimed at storing photovoltaic energy when this energy is not used by the consumer units 7. This energy storage unit 103 may be discharged when the photovoltaic electricity generation unit 101 does not product electricity or not enough electricity for example during the night to meet the electrical demand of the consumer units 7. The energy storage unit 103 may comprise one or more modules able to store electrical energy. The energy storage unit 103 may be chosen among a lead-based battery, a nickel-based battery, or a lithium-based battery for example. More particularly, the lead-based battery may be chosen among an open lead battery comprising an electrolyte of sulfuric acid diluted or a closed lead battery comprising a gelled electrolyte; the nickel-based battery may be a nickel metal hydride battery; and the lithium-based battery may be chosen among the lithium-ion batteries, the lithium-metal batteries, or the lithium-polymer batteries. According to the particular embodiment of FIG. 1, the energy storage unit 103 is buried near the photovoltaic electricity generation unit 101. However, according to other embodiments not represented here, other implementations of this energy storage unit 103 may be envisioned.

Furthermore, the thermal engine driven electricity generation unit 105 allows the energy supply system 100 meeting the electricity needs even in case of grid interruption or when the photovoltaic electricity generation unit 101 does not work and when the energy storage unit 103 is unable to provide electrical energy. The at least one thermal engine driven electricity generation unit 105 may be chosen among fuel generator or diesel generator for example. According to the present disclosure, several kinds of generators may be used and in particular of several sizes. Those generators may choose among the generators having a small size and able to produce less than 15 kVA to heavy generators able to produce up to 1000 kVA. Moreover, it is possible to couple two different kinds of generators if necessary.

According to the installation 5 and the energy demand of the different consumer units 7 it is necessary to design the energy supply system 100 to have the most efficient system regarding the energy demand of this installation 5. Indeed, this installation 5 may have different times at which the electricity demand may be higher than at other times of the day. Moreover, the existing support structure 3 of the installation 5 may be a limitation for the implementation of the photovoltaic modules 102 for example. Thus, there is a need to provide means for designing an optimized energy supply system 100.

Figure 2:
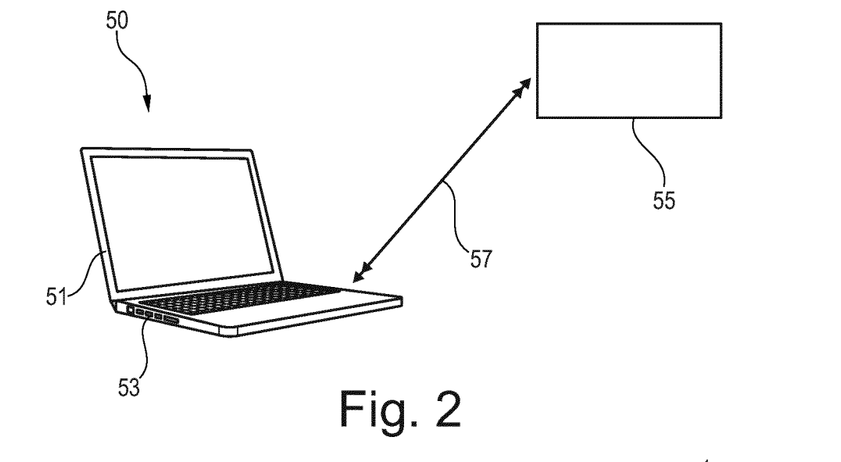
FIG. 2 illustrates a schematic view of a computer system configured for implementing a computer-implemented method for providing technical sizing parameters of the installation of FIG. 1.

Computer System, Computer Program Product, and Computer-Implemented Method for Providing Technical Sizing of the Energy Supply System:

Now referring to FIG. 2, there is represented a computer system 50 for providing technical sizing parameters for the energy supply system 100 of the installation 5 of FIG. 1. The computer system 50 comprises user interface means 51 and a database 53 able to store data entered via the user interface means 51.

The user interface means 51 are configured for entering data corresponding to electricity consumption chronology for a predetermined time period of said installation 5, photovoltaic module 102 yearly production curve for a specific location. The user interface means 51 are further configured for displaying a plurality of energy supply system configurations according to the energy requirements of this installation 5 for example.

The computer program product further comprises a sizing module 55. The database 53 is in communication with the sizing module 55 that is able to estimate the technical sizing parameters of the energy supply system 100 based on the entry parameters. According to the particular embodiment of FIG. 2, the communication between the database 53 and the sizing model 55 is an internet communication channel 57. However, according to another embodiment not represented here, this communication channel 57 can be another type of communication channel such as a VPN channel for example.

The computer system 50 further comprises means for executing a computer program product for implementing a computer-implemented method 1 (represented on FIG. 3) to determine optimal technical sizing parameters of said energy supply system 100.

Figure 3:
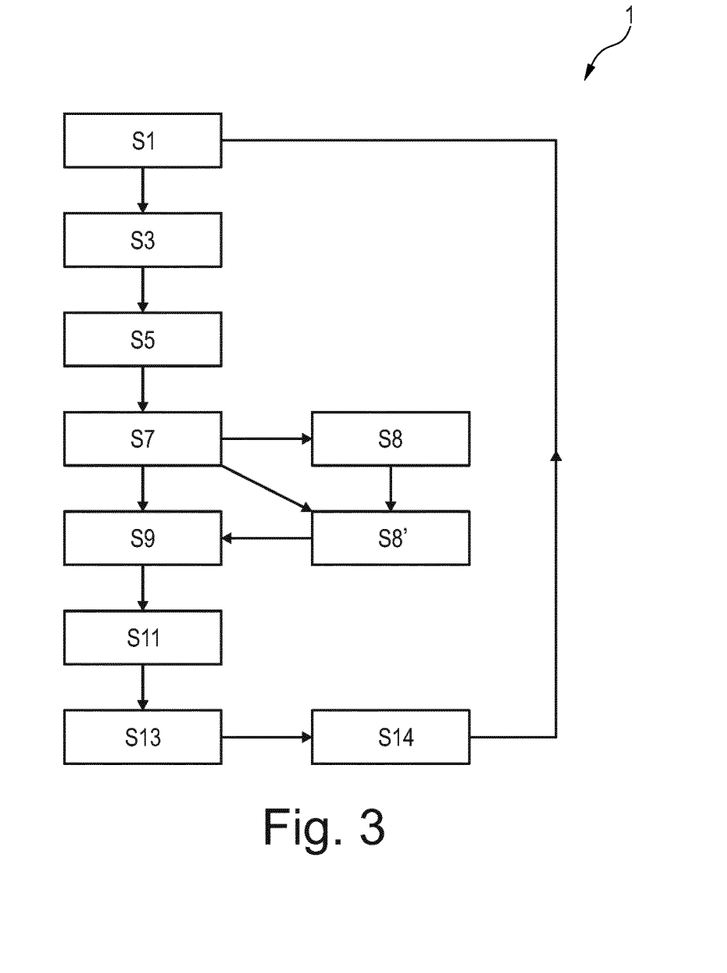
FIG. 3 illustrates a schematic chart of different steps implemented by the computer-implemented method.

Referring to FIG. 3, there is represented the computer-implemented method 1 of providing technical sizing parameters for the energy supply system 100. The computer-implemented method comprises several steps.

The method 1 comprises a step of entering for a predetermined time period electricity consumption chronology S1 of said installation 5 in the database 53 via the user interface means 51. Indeed, it is necessary to determine the energy needs of this installation 5 in order to meet the energy demand with the energy supply system 100.

The method 1 then implements a step of entering photovoltaic module 102 yearly production curve for a specific location S3. Indeed, depending on the location of the installation 5 the expected production of the photovoltaic modules 102 may be different and this parameter has to be taken into consideration in order to determine the sizing parameters of this energy supply system 100 to meet the demand of the consumer units 7 of the installation 5.

Then, the method 1 implements a step of entering a type of photovoltaic module 102 and its technical parameters S5. Nowadays, there exist several kinds of photovoltaic modules 102 having different generation power and different costs. More particularly, the type of photovoltaic module 102 may comprise its sizes, the nature of the photovoltaic cells (silicon-based, organic-based, cadmium-tellure-based, or selenium and indium copper alloys-based for example), the connections of the different cells (serial or bypass). Thus, the user at this step is able to select the photovoltaic module 102 of the energy supply system 100 aimed at being installed on the installation 5.

The method 1 further implements a step of entering specific equipment boundary conditions S7 to well illustrate the existing conditions of the installation 5.

Moreover, to restrain the computing steps of the computer system 50, the method 1 further implements a step of entering photovoltaic production capacity limits and energy storage unit capacity limits S9. It is thus possible to compute the technical sizing parameters only between predefined limits in order to decrease the time of response of the computer system 50.

The method 1 then implements a step of estimating a ratio S11 of self-sufficiency 10 (see FIG. 6) or of self-consumption 20 (see FIG. 6), or of internal rate of return 30 (see FIG. 6) based on several values of the photovoltaic production capacity and of the energy storage unit capacity, said values being comprised between the limits defined at the step of entering photovoltaic production capacity limits and energy storage unit capacity limits S9. These parameters will be described more in details in the following of the description based on FIG. 6. Indeed, according to the needs of the installation 5, different capacities for the photovoltaic electricity generation units 101 and for the energy storage units 103 may be chosen and the method 1 is able to display those different configurations during a displaying step S13 of a plurality of energy supply system configurations on the user interface means 51. This plurality of energy supply system configurations is based on the technical sizing parameters obtained at the previous steps, a cost of each energy supply system configuration, and an aging devaluation of each energy supply system configuration. The present method 1 associates each configuration to a sensitivity parameter based on an energy production reliability of said energy supply system and on a grid reliability of said public grid, said sensitivity parameter enabling determining the optimized technical sizing parameters of the energy supply system 100 regarding the reliability of the public grid. The sensitivity parameter may further be based on a capital expenditure of said energy supply system 100, or on the cost of the public grid electricity.

Thus, during this displaying step S13, the method 1 computes with the computer program product and displays on the user interface means 51 power of the photovoltaic electricity generation unit 101 and sizes of modules constituting the energy storage unit 103, that when combined to offer several configurations allow to obtain a ratio of self-sufficiency 10, self-consumption 20, and/or internal rate of return 30, that is displayed too on the user interface means 51 at this displaying step S13 as it will be explained in further detail here-after.

In the case where the energy supply system 100 comprises at least one thermal engine driven electricity generation unit 105, the method 1 further comprises a step of entering technical parameters of the at least one thermal engine driven electricity generation unit S8. This step of entering technical parameters of the at least one thermal engine driven electricity generation unit S8 is performed just after the step of entering specific equipment boundary condition S7. Moreover, when the energy supply system 100 comprises more than one thermal engine driven electricity generation unit 105, this step S8 is performed for each thermal engine driven electricity generation unit 105. The method 1 computes the energy produced by the at least one thermal energy driven electricity generation unit 105.

According to this particular embodiment, the sensitivity parameter may further take into account an evolution cost of the propellant for the thermal energy driven electricity generation unit 105.

As a variant or in addition, the method 1 may further comprise a step of entering technical parameters of the energy storage unit S8', said step S8' being performed before the step of entering production capacity limits and energy storage capacity limits S9. According to this step of entering technical parameters of the energy storage unit S8', the method 1 computes the cycle number of the energy storage unit 103 to determine the degradation of this energy storage unit 103.

As another variant or in addition, the method 1 may further comprise a step of computing a cost model S12. This step of computing a cost model S12 is performed just before the step of displaying S13 a plurality of energy supply system configurations to ensure an optimal energy supply system design. The cost model takes into account the energy supply system configuration chosen, the photovoltaic production capacity limits, the energy storage unit capacity limits, and the aging devaluation of the energy supply system configuration. The step of computing a cost model S12 is implemented by a cost module integrated into the sizing module 55.

The cost model may take into account different elements to determine the cost of the energy supply system 100 such as the size of the energy storage unit 103, the power of the photovoltaic electricity generation unit 101, or the power of the thermal engine driven electricity generation unit 105. Indeed, according to the size of those different elements, their initial costs, their lifetime and maintenance costs, their production capacities would not be the same.

Moreover, according to a particular embodiment, the method 1 may further comprise a step of storing S14 the computed data into the database 53 for a further installation. This step of storing S14 the computed data is performed after the step of displaying S13 a plurality of energy supply system configurations.

According to the particular embodiment illustrated in FIG. 3, the method 1 may form a cycle, that is to say that the method 1 may get back to the step of entering for a predetermined time period electricity consumption chronology S1 after the step of storing S14 the computed data. Thus, this method 1 can be reiterated but this is not mandatory and it can be stopped after the step of storing S14 the computed data.

Thus, the computer program product comprises means for computing data obtained at the previously disclosed steps of entering for a predetermined time period electricity consumption chronology S1 of the installation 5, entering photovoltaic module 102 yearly production curve for a specific location S3; entering a type of photovoltaic module 102 and its technical parameters S5; entering specific equipment boundary conditions S7 to well illustrate the existing conditions of the installation 5; and entering photovoltaic production capacity limits and energy storage unit capacity limits S9. Based on those data, the computer program product computes a ratio of self-sufficiency 10, or of self-consumption 20, or of internal rate of return 30 based on several values of the photovoltaic production capacity and the energy storage unit capacity, said values being comprised between the limits entered. The computer program product then displays a plurality of energy supply system configurations on the user interface means 51, based on the technical sizing parameters, a cost of each energy supply system configurations, and an aging devaluation of each energy supply system configuration.

The computer program product further computes for each configuration a sensitivity parameter based on an energy production reliability of said energy supply system and on a grid reliability of said public grid, said sensitivity parameter enabling determining the optimized technical sizing parameters of the energy supply system regarding the reliability of the grid.

In addition or as a variant, the computer program product may further comprise a cost module configured for being in communication with the database 53 for computing a cost model taking into account the energy supply system configuration chosen, the photovoltaic production capacity limits, the energy storage unit capacity limits, and the aging devaluation of the energy supply system configuration to ensure an optimal energy supply system design.

The computer program product may further take into account for computing the sensitivity parameter a capital expenditure of said energy supply system configuration, and/or the cost of the electricity of the public grid, and/or the cost of the propellant for the thermal engine driven electricity generation unit 105. Thus, this computer program product may take into account and in combination several parameters to determine a sensitivity parameter for several configurations of power of the photovoltaic electricity generation unit capacities, and of energy storage unit capacities to propose the most efficient configuration regarding the needs of the installation 5.

To implement the method 1 previously disclosed, the computer system 50 has to be connected to the sizing module 55 via an internet communication channel 57 for example. However, it is possible to enter the different data into the computer program product in an offline configuration, and the computation will be done once the computer system 50 is connected to the sizing module 55. Indeed, it could sometimes be difficult to find an internet connection. The possibility to work offline enables entering all the data necessary for the computation directly on site where there is no internet connection and computing those data later. Moreover, according to another variant, the method 1 may be implemented in a semi-offline mode. According to this other variant, the computer system 50 may be connected to the sizing module 55 only computations are required and may be able to work offline when the data are entered at the different steps of the method 1.

Particular Embodiment

Now referring to FIGS. 4A to 6, it is represented several curves and tables representing a computation done for a specific gas station in Nigeria to determine the best configuration of the energy supply system 100 for this specific gas station.

The gas station corresponds to the installation 5 of FIG. 1. This gas station has a predetermined surface aimed at being covered by photovoltaic modules for example. Moreover, in Nigeria, the grid is subject to potential service interruptions and it is necessary to offer an energy supply system 100 able to produce energy in a sufficient manner to meet the needs of this gas station during the whole day, that is to say during the open hours and during the closed hours.

The different parameters such as the specific location and the surface aimed at being covered by photovoltaic modules have been entered in the computer program product via the user interface means 51 (represented on FIG. 2). The gas station is aimed at being equipped with the photovoltaic electricity generation unit 101, at least one energy storage unit 103, and at least one thermal engine driven electricity generation unit 105 (all those elements are represented on FIG. 1).

Figure 4A:
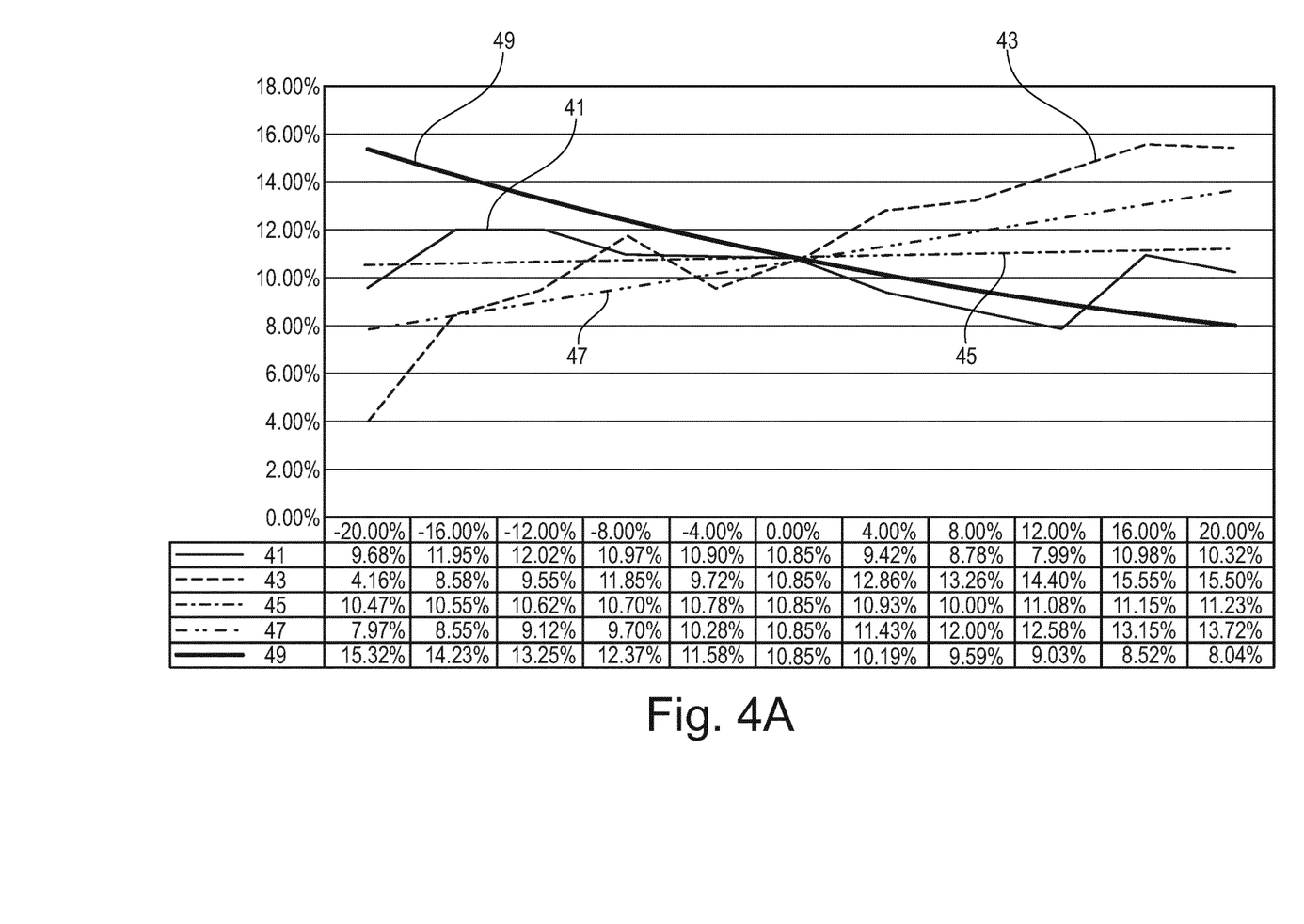
FIG. 4A illustrates a schematic representation of a sensibility analysis of an internal rate of return for a particular installation.
Figure 4B:
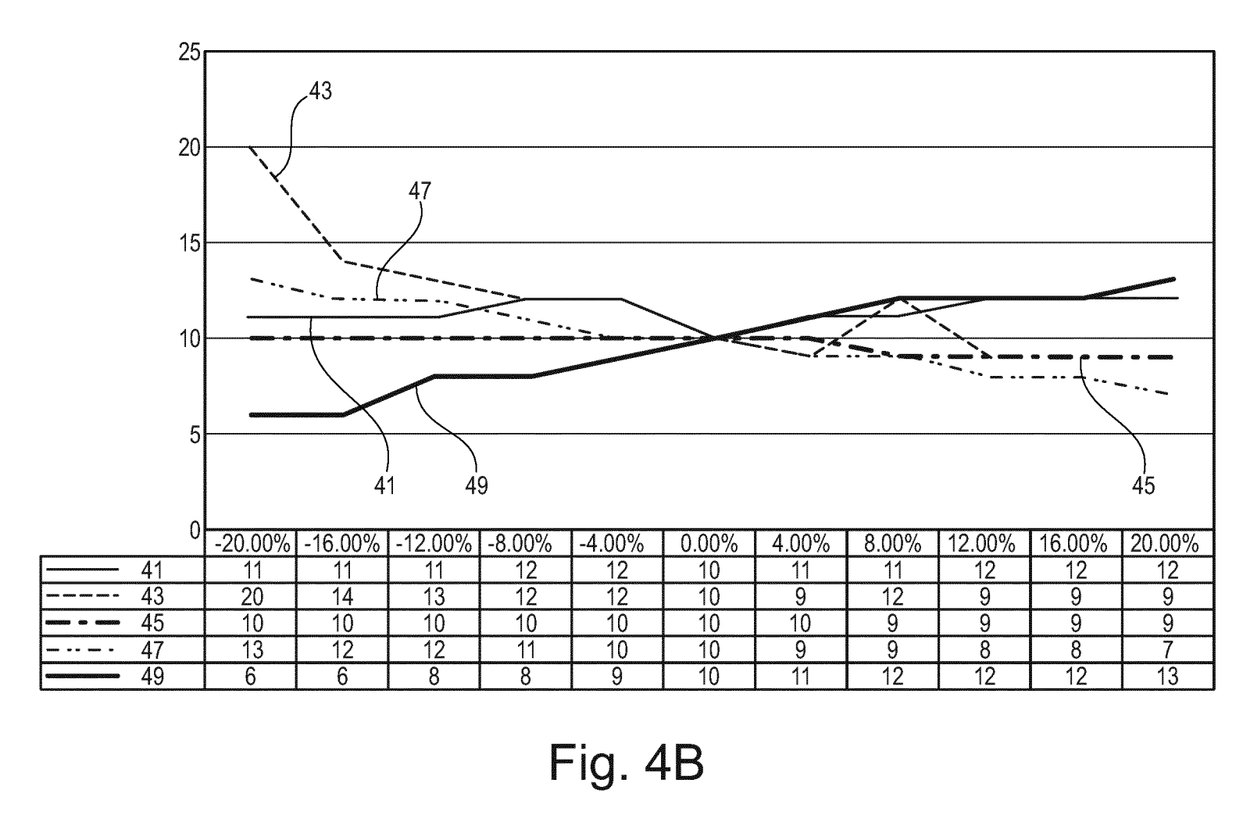
FIG. 4B illustrates a schematic representation of a sensibility analysis of a payback period for the particular installation of FIG. 4A.

According to FIGS. 4A and 4B, there is represented a chart showing the sensitivity of some parameters for the specific gas station of this embodiment. More particularly, according to this particular embodiment, the curve 41 illustrates the grid availability, the curve 43 illustrates the solar yields, the curve 45 illustrates the grid electricity price, the curve 47 illustrates the price of the propellant for the thermal engine driven electricity generation unit, and the curve 49 illustrates the total cost of expenditure.

According to the particular embodiment of FIG. 4A, the ordinate of this chart illustrates the internal rate of return and the values in the table of FIG. 4A illustrates the variation of this internal rate of return compared to a predetermined evolution of the parameters corresponding to the considered line. However, this parameter can be changed to illustrate another parameter, such as the self-sufficiency for example. Furthermore, the table represented under this chart illustrates the sensitivity of the different parameters corresponding to the curves 41-49. More particularly, the sensitivity of each parameter is computed between a −20% to a +20% around a central value. The sensitivity parameter thus corresponds to a difference of evolution compared to a predicted evolution of the considered parameter. Indeed, the more the sensitivity of the parameter varies, the more this parameter should be considered with attention in order for the energy supply system to meet the requirements for the installation.

According to the particular embodiment of FIG. 4B, the ordinate of this chart corresponds to the variation of the payback period. As for the table of FIG. 4A, the table of FIG. 4B illustrates the variation of the payback period regarding an evolution of a particular parameter.

For example, an increase of 12% of the propellant price (line 47 of both charts), will pass the internal rate of return from 10.85% to 12.85% (FIG. 4A) and decrease the payback period of two years, this payback period passing of 10 years to 8 years (FIG. 8B).

Figure 5A:
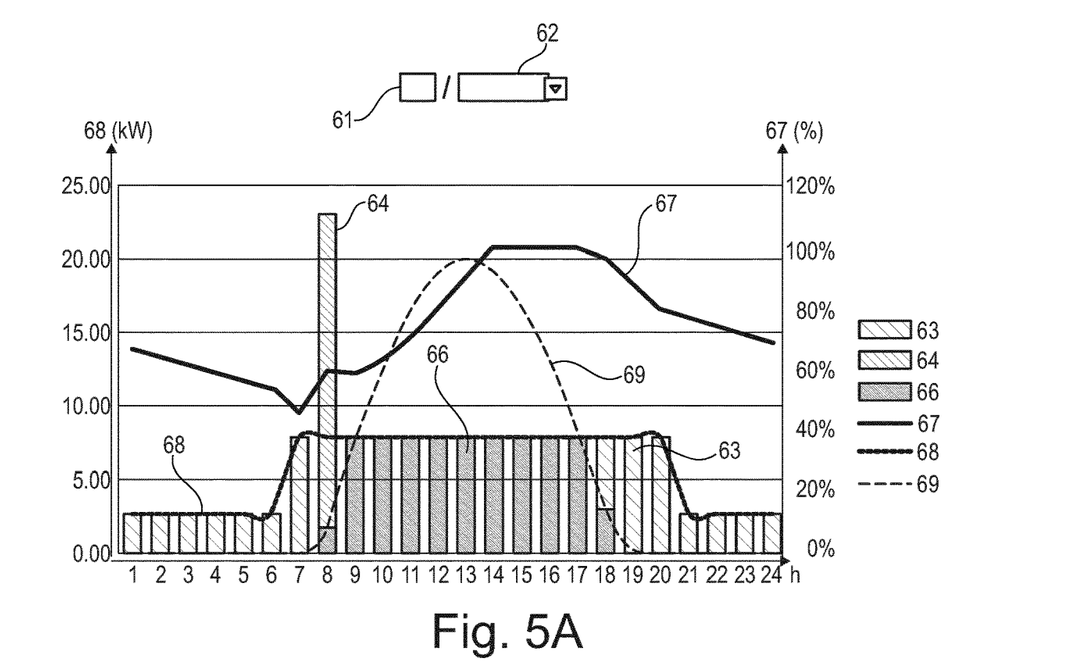
FIGS. 5A to 5C illustrates a schematic representation of the energetic origin for the consumption of the particular installation.
Figure 5B:
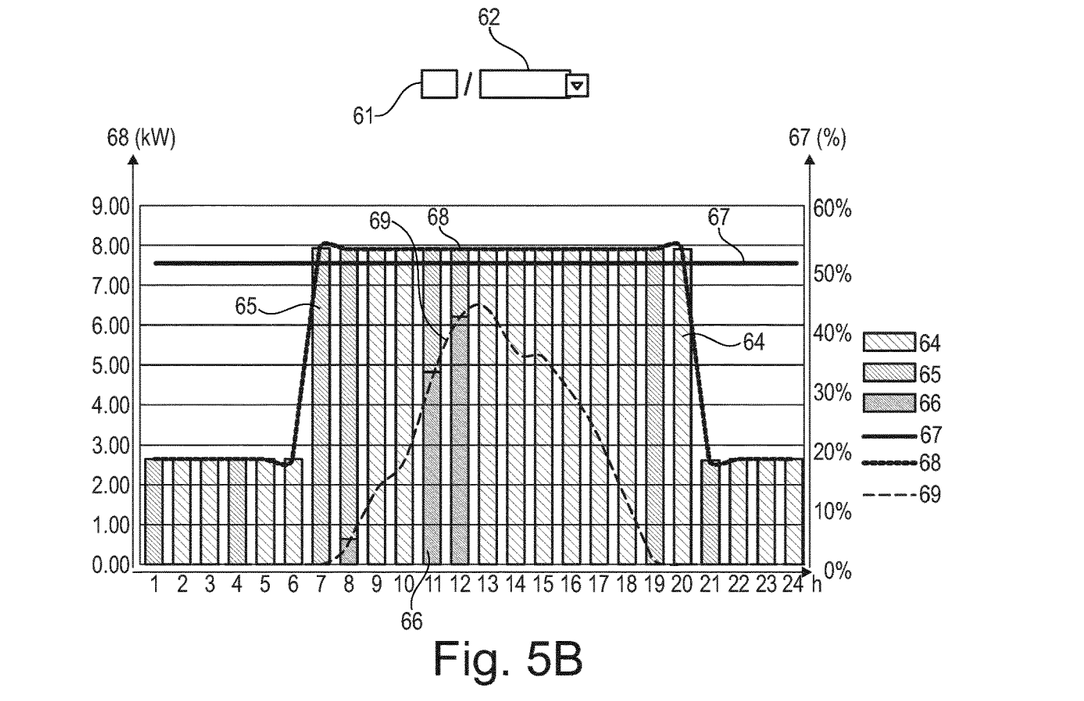
Figure 5C:
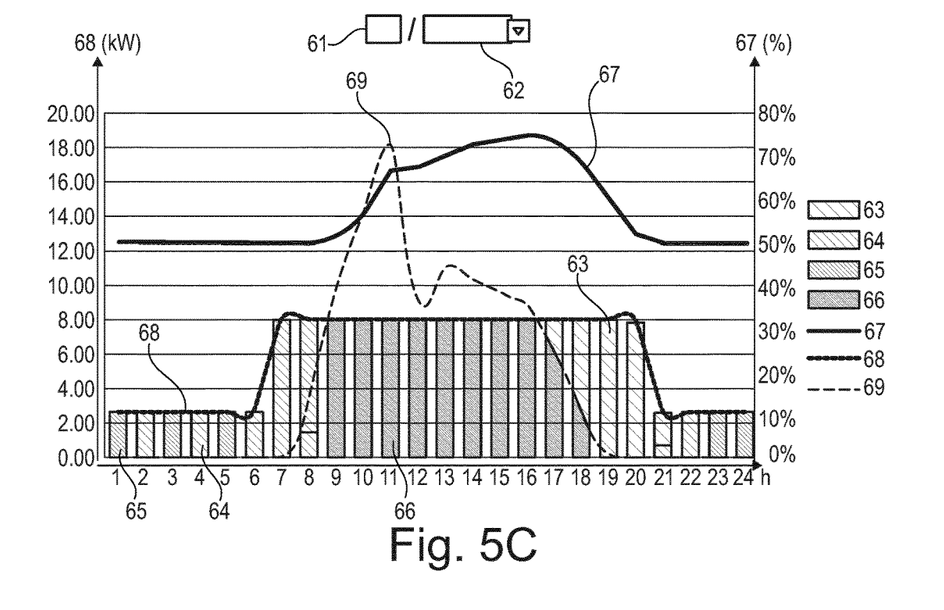

According to FIGS. 5A to 5C, there is represented several charts showing the spread of the energy consumed by the installation 5 according to different days of the year. More particularly, the box 61 corresponds to the number of the day and the box 62 corresponds to the month. Thus, FIG. 5A illustrates the spread of the energy consumption for the 13 January, FIG. 5B illustrates the spread of the energy consumption for the 13 June, and FIG. 5C illustrates the spread of the energy consumption for the 13 March. Those different spreads corresponds to estimations regarding the different parameters entered in the computer program product. Moreover, on all these charts, the abscissa axis represents the hour of the day h in order to follow those energy consumption very precisely and determine easily which kind or energy would be used to meet the energy demand of the installation 5.

Furthermore, according to those FIGS. 5A to 5C, the bars 63 illustrate the power of the energy storage unit 103 used, the bars 64 illustrate the power of the thermal engine driven electricity generation unit 105, the bars 65 illustrate the power of the public grid used, and the bars 66 illustrate the power of the photovoltaic produced energy used by the photovoltaic modules 102 of the energy supply system 100. Moreover, the curve 67 illustrates the state of charge evolution the energy storage unit 103. This curve 67 enables determining if the energy storage unit 103 is in a state of charge or in a state of discharge, and with which kind of energy this energy storage unit 103 is charged. According to the particular embodiment of this specific example, the energy storage unit 103 used there is a battery. In a general manner, to increase the lifetime of the battery, the state of charge of this battery should be always up to 50%, 100% corresponding to a full battery and 0% corresponding to a low battery. In a general manner, this battery is loaded at a maximum state of charge of 95% in order to prevent degradation that can occur when the state of charge of this battery is too high. Moreover, the curve 68 illustrates the load needed by the installation 5 during the different hours of the day, and the curve 69 illustrates the photovoltaic production done by the photovoltaic electricity generation unit 101.

Moreover, on those charts, the ordinate axis 68 illustrates the load needed by the installation 5 in kilowatts (kW) and the ordinate axis 67 illustrates the state of charge of the energy storage unit 103 (in percent).

According to the specific date represented by FIG. 5A, no grid energy is needed to meet the demand of the installation 5. The thermal engine driven electricity generation unit 105 is only started at the beginning of the day to charge the energy storage unit 103 which have been used during the night to meet the electrical demand of the installation 5. Moreover, this energy storage unit 103 is then charged with the photovoltaic energy produced by the photovoltaic modules 102 during the rest of the day, this photovoltaic energy generated by the energy supply system 100 being also used to meet the electrical demand of the consumer units 7 of the installation 5 during the day. The curve 67 of FIG. 5A illustrates this. Indeed, when the thermal engine driven electricity generation unit 105 is started, the state of charge of the energy storage unit 103 increases. This shows that the thermal engine driven electricity generation unit 105 is used to charge the energy storage unit 103. Moreover, this thermal engine driven electricity generation unit 105 is also used to meet the electrical needs of the consumer units 7 of the installation 5. Indeed, the bar 64 at 8 a.m. is under the curve 68 illustrating the load needed by the installation 5. Moreover, at 8 a.m., the energy supply system 100 implements a backup and in order to meet the energy demand of the installation 5, the thermal engine driven electricity generation unit 105 is used. Thus, a part of the energy produced by the thermal engine driven electricity generation unit 105 is used to meet the electrical demand of the installation 5 and another part of this energy is used to charge the energy storage unit 103. Indeed, FIG. 5A illustrates the prevision chart for a day in January in Nigeria. However, January is the dry season in Nigeria, and the sunshine during the day is high.

According to the specific embodiment of FIG. 5B, grid energy is needed to meet the electrical demand of the installation 5. Indeed, this figure illustrates a date in March. However, March in Nigeria corresponds to the rainy season. As represented on this chart, the grid power is used, sometimes coupled with the photovoltaic energy produced when it is the case and in case of failure of this grid the thermal engine driven electricity generation unit 105 is used, even if photovoltaic electricity is produced by the photovoltaic electricity generation unit 101 (as indicated by curve 69). Indeed, if the grid is interrupted, the thermal engine driven electricity generation unit 105 is started. According to the particular embodiment illustrated here, the thermal engine driven electricity generation unit 105 needs 5 minutes to connect and it is necessary that the energy supply system 100 compensate this time to prevent any blackout. This compensation is possible due to the presence of the energy storage unit 103. However, to prevent any damage of the electricity generation unit 101, the photovoltaic energy produced by the photovoltaic modules 102 is not used. According to this specific date, the state of charge of the energy storage unit 103 stays at 50% to prevent any damage or early aging of this energy storage unit 103.

Then, according to FIG. 5C, all kinds of energy are used to meet the energy demand of the installation 5. According to this particular embodiment, the grid energy is only used during the closed periods of the installation 5. Indeed, during the open hours, the thermal engine driven electricity generation unit 105, the photovoltaic electricity generation unit 101 and the energy storage unit 103 are used to meet the electrical demand of the consumer units 7 of the installation 5. As illustrated on FIG. 5C, the grid is subjected to interruptions during night and the thermal engine driven electricity generation unit 105 is started to compensate the grid deficiencies. Moreover, as represented by curve 69, the photovoltaic production decreases sometimes, resulting in a lower speed of charge of the energy storage unit 103 because the photovoltaic energy produced is firstly used to meet the electrical demand of the installation 5 and in a second time to charge the energy storage unit 103. Moreover, the state of charge of the energy storage unit 103 does not reach 100% explaining the shortest time of use of this energy storage unit 103 to meet the electrical demand of the installation 5.

Figure 6:
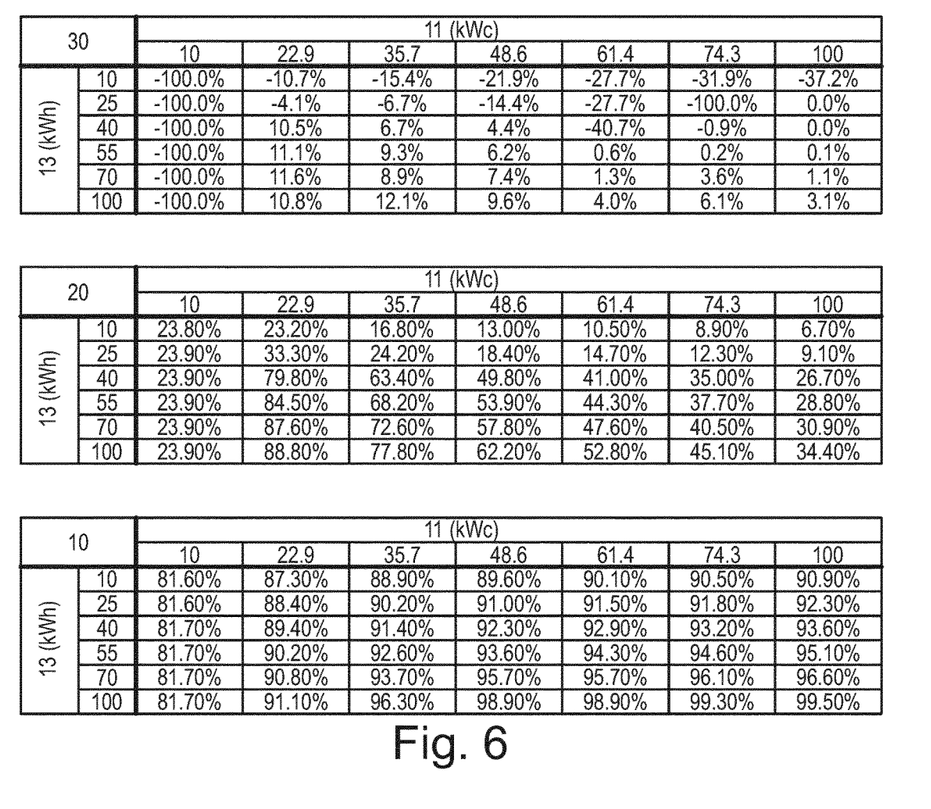
FIG. 6 illustrates a schematic chart representing the potential configurations of an energy supply system for the particular installation.

Then, according to FIG. 6, there is represented the different computations done by the computer program product for several sizing parameters. More particularly, the computations have been done for the self-sufficient 10 of the installation 5, for the self-consumption 20 of the installation 5 and for the internal rate of return 30 of this installation 5. At the step of entering photovoltaic production capacity limits and energy storage capacity limits E9 of the method 1 previously disclosed, those limits have been chosen between 10 and 100. More precisely, the energy storage limits 13 have been chosen between 10 and 100 kilowatt per hour (kWh) and the photovoltaic production capacity limit 11 have been chosen between 10 and 100 kilowatt-peak (kWc). The computer program product computes for different configurations of the energy storage capacity limit and the photovoltaic production capacity limit as represented in the different charts of FIG. 6.

For example for a photovoltaic production capacity 11 of 35.7 kWc and an energy storage capacity 13 of 70 kWh, the self-sufficiency 10 of the installation would be of 93.70%, the self-consumption 20 of the installation would be of 72.60%, and the internal rate of return 30 would be of 8.9%.

Those different charts correspond to the results displayed on the user interface means 51 (represented on FIG. 2)

during the step of displaying E13 a plurality of energy supply system (100) configurations. Then, according to the results obtained, the user may determine which configuration would be the best one to ensure the meet of the electrical demand of the installation 5.

The particular embodiment disclosed here, is only an exemplary one and is not intended to interpret the present disclosure in a restrictive manner.

Thus, the determination of technical sizing parameters for an energy supply system 100 in a simple way is possible due to the computer-implemented method 1 and the computer program product disclosed here-above.

The invention claimed is:

1. A computer-implemented method of providing technical sizing parameters for an energy supply system (100) on an existing support structure (3) having a predetermined available surface to be equipped with photovoltaic modules (102), said energy supply system (100) comprising:
  a photovoltaic electricity generation unit (101) having at least one photovoltaic module (102),
  an energy storage unit (103), and
  at least one thermal engine driven electricity generation unit (105),
the energy supply system (100) being configured to supply electrical energy to an installation (5) having at least one consumer unit (7) and being connected to a public grid subject to potential service interruptions, said computer-implemented method (1) comprising the steps of:
  entering for a predetermined time period electricity consumption chronology (SI) of said installation (5) in a database (53) via user interface means (51);
  entering photovoltaic module (102) yearly production curve for a specific location (S3);
  entering a type of photovoltaic module (102) and its technical parameters (S5);
  entering specific equipment boundary conditions (S7) to illustrate the existing conditions of the installation (5);
  entering photovoltaic production capacity limits and energy storage unit capacity limits (S9);
  estimating a ratio (S11) of self-sufficiency (10) or of self-consumption (20), or of internal rate of return (30) based on several values of the photovoltaic production capacity and of the energy storage unit capacity, said values being comprised between the limits defined at the step of entering photovoltaic production capacity limits and energy storage unit capacity limits (S9);
  displaying (S13) a plurality of energy supply system configurations on the user interface means (51), said plurality of energy supply system configurations being based on:
    said technical sizing parameters obtained at the previous steps;
    a cost of each energy supply system configuration; and
    an aging devaluation of each energy supply system configuration;
wherein each configuration is associated to a sensitivity parameter based on an energy production reliability of said energy supply system and on a grid reliability of said public grid, said sensitivity parameter enabling to determine the optimized technical sizing parameters of the energy supply system (100) regarding the reliability of the public grid.

2. The method of claim 1, further comprising a step of entering technical parameters of the at least one thermal engine driven electricity generation unit (S8), said step (S8) being performed just after the step of entering specific equipment boundary condition (S7).

3. The method of claim 2, wherein the sensitivity parameter further takes into account an evolution cost of the propellant for the thermal energy driven electricity generation unit (105).

4. The method of claim 1, further comprising a step of entering technical parameters of the energy storage unit (S8'), said step (S8') being performed before the step of entering production capacity limits and energy storage capacity limits (S9).

5. The method of claim 4, wherein it computes the cycle number of the energy storage unit (103) to determine the degradation of the energy storage unit (103).

6. The method according claim 1, wherein the database (53) is in communication with a sizing model (55) able to estimate the technical sizing parameters of the energy supply system (100) based on the entry parameters.

7. The method of claim 1, further comprising a step of computing a cost model (S12), said step of computing a cost model (S12) being performed just before the step of displaying (S13) a plurality of energy supply system configurations to ensure an optimal energy supply system design, said cost model taking into account the energy supply system configuration chosen, the photovoltaic production capacity limits, the energy storage unit capacity limits, and the aging devaluation of the energy supply system configuration.

8. The method of claim 7, wherein the cost model (S12) is calculated by a cost module integrated into the database (53).

9. The method of claim 1, further comprising a step of storing (S14) the computed data into the database (53) for a further installation, said step of storing (S14) the computed data being performed after the step of displaying (SI 3) a plurality of energy supply system configurations.

10. The method of claim 1, wherein the sensitivity parameter is further based on a capital expenditure of said energy supply system (100).

11. The method of claim 1, wherein the sensitivity parameter further takes into account the cost of the public grid electricity.

12. The method of claim 1, wherein it computes and displays on the user interface means (51) power of the photovoltaic electricity generation unit (101).

13. The method of claim 1, wherein it further computes and displays on the user interface means (53) sizes of modules constituting the energy storage unit (103).

14. A non-transitory computer-readable storage medium having stored thereon a computer program for providing technical sizing parameters for an energy supply system (100) on an existing support structure (3) having a predetermined available surface to be equipped with photovoltaic modules (102), said energy supply system (100) comprising:
  a photovoltaic electricity generation unit (101) having at least one photovoltaic module (102),
  an energy storage unit (103), and
  at least one thermal engine driven electricity generation unit (105), the energy supply system (100) being configured to supply electrical energy to an installation (5) having at least one consumer unit (7) and being connected to a public grid subject to potential service interruptions, said computer program comprising means for computing data obtained at steps of:
  entering for a predetermined time period electricity consumption chronology (S1) of said installation (5) in a database (53) via user interface means (51);
  entering photovoltaic module (102) yearly production curve for a specific location (S3);

entering a type of photovoltaic module (102) and its technical parameters (S5);

entering specific equipment boundary conditions (S7) to illustrate the existing conditions of the installation (5);

entering photovoltaic production capacity limits and energy storage unit capacity limits (S9); based on those data, the computer program product computes a ratio of self-sufficiency, or of self-consumption, or of internal rate of return based on several values of the photovoltaic production capacity and the energy storage unit capacity, said values being comprised between the limits entered;

displays a plurality of energy supply system configurations on the user interface means (51), said plurality of energy supply system configurations being based on:
said technical sizing parameters;
a cost of each energy supply system configurations; and
an aging devaluation of each energy supply system configuration;

wherein the computer program product computes for each configuration a sensitivity parameter based on an energy production reliability of said energy supply system and on a grid reliability of said public grid, said sensitivity parameter enabling to determine the optimized technical sizing parameters of the energy supply system regarding the reliability of the grid.

15. The non-transitory computer-readable storage medium having stored thereon a computer program of claim 14, characterized in that it further comprises a sizing module configured for being in communication with the database (53), said sizing module being able to estimate the technical sizing parameters of the energy supply system (100) based on the entry parameters.

16. The non-transitory computer-readable storage medium having stored thereon a computer program of claim 14, wherein the computer program product further comprises a cost module configured for being in communication with the database (53) for computing a cost model taking into account the energy supply system configuration chosen, the photovoltaic production capacity limits, the energy storage unit capacity limits, and the aging devaluation of the energy supply system configuration to ensure an optimal energy supply system design.

17. The non-transitory computer-readable storage medium having stored thereon a computer program of claim 14, wherein it further takes into account for computing the sensitivity parameter a capital expenditure of said energy supply system configuration.

18. The non-transitory computer-readable storage medium having stored thereon a computer program of claim 14, wherein it further takes into account for computing the sensitivity parameter the cost of the electricity of the public grid.

19. The non-transitory computer-readable storage medium having stored thereon a computer program of claim 14, wherein it further takes into account for computing the sensitivity parameter the cost of the propellant for the thermal engine driven electricity generation unit (105).

20. A computer system (50) for providing technical sizing parameters for an energy supply system (100) on an existing support structure (3) having predetermined available surface to be equipped with photovoltaic modules (102), said energy supply system (100) comprising:

a photovoltaic electricity generation unit (101) having at least one photovoltaic modules (102), an energy storage unit (103); and at least one thermal engine driven electricity generation unit (105), the energy supply system (100) being configured to supply electrical energy to an installation (5) having at least one consumer unit (7) and being connected to a public grid subject to potential interruptions, said computer system (50) comprising:

user interface means (51) for entering data corresponding to electricity consumption chronology for a predetermined time period of said installation (5), photovoltaic module (102) yearly production curve for a specific location, said user interface means (51) being further configured for displaying a plurality of energy supply system configurations; and a database (53) able to store the data entered via the user interface means (51);

characterized in that the computer system (50) further comprises means for executing a computer program product for providing technical sizing parameters for an energy supply system (100) on an existing support structure (3) having a predetermined available surface to be equipped with photovoltaic modules (102), said energy supply system (100) comprising:

a photovoltaic electricity generation unit (101) having at least one photovoltaic module (102), an energy storage unit (103), and at least one thermal engine driven electricity generation unit (105), the energy supply system (100) being configured to supply electrical energy to an installation (5) having at least one consumer unit (7) and being connected to a public grid subject to potential service interruptions, said computer program product comprising means for computing data obtained at steps of:

entering for a predetermined time period electricity consumption chronology (SI) of said installation (5) in a database (53) via user interface means (51);

entering photovoltaic module (102) yearly production curve for a specific location (S3);

entering a type of photovoltaic module (102) and its technical parameters (S5);

entering specific equipment boundary conditions (S7) to illustrate the existing conditions of the installation (5);

entering photovoltaic production capacity limits and energy storage unit capacity limits (S9);

based on those data, the computer program product computes a ratio of self-sufficiency, or of self-consumption, or of internal rate of return based on several values of the photovoltaic production capacity and the energy storage unit capacity, said values being comprised between the limits entered;

displays a plurality of energy supply system configurations on the user interface means (51), said plurality of energy supply system configurations being based on:
said technical sizing parameters;
a cost of each energy supply system configurations; and
an aging devaluation of each energy supply system configuration;

wherein the computer program product computes for each configuration a sensitivity parameter based on an energy production reliability of said energy supply system and on a grid reliability of said public grid, said sensitivity parameter enabling to determine the optimized technical sizing parameters of the energy supply system regarding the reliability of the grid for implementing the computer-implemented method according to claim 1 to determine optimal technical sizing parameters of said energy supply system (100).

21. The computer system (50) according to claim 20, wherein the user interface means (51) display the ratio of self-sufficiency (10), or of self-consumption (20), or of internal rate of return (30) based on several configurations of the photovoltaic electricity generation unit (101) and of the energy storage unit (103), said ratio being computed by the computer program product.

* * * * *